US012562438B2

(12) United States Patent (10) Patent No.: US 12,562,438 B2

Watanabe (45) Date of Patent: Feb. 24, 2026

(54) POWER STORAGE DEVICE

(71) Applicant: PRIME PLANET ENERGY & SOLUTIONS, INC., Tokyo (JP)

(72) Inventor: Daiki Watanabe, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 569 days.

(21) Appl. No.: 18/076,764

(22) Filed: Dec. 7, 2022

(65) Prior Publication Data

US 2023/0318150 A1 Oct. 5, 2023

(30) Foreign Application Priority Data

Mar. 29, 2022 (JP) ................................. 2022-054448

(51) Int. Cl.
H01M 50/533 (2021.01)
H01M 50/538 (2021.01)

(52) U.S. Cl.
CPC ....... H01M 50/533 (2021.01); H01M 50/538 (2021.01)

(58) Field of Classification Search
CPC ........................... H01M 50/533; H01M 50/538
USPC ........................................................ 429/209
See application file for complete search history.

(56) References Cited

U.S. PATENT DOCUMENTS

| | | | | |
|---|---|---|---|---|
| 10,665,829 B2 * | 5/2020 | Wakimoto | ............ | H01M 50/15 |
| 2020/0266493 A1 * | 8/2020 | Toi | ...................... | H01M 50/528 |
| 2023/0033391 A1 | 2/2023 | Miyamura et al. | | |
| 2023/0061024 A1 * | 3/2023 | Yoneyama | .......... | H01M 50/543 |
| 2024/0136590 A1 * | 4/2024 | Watanabe | ......... | H01M 10/0431 |

FOREIGN PATENT DOCUMENTS

| | | | | |
|---|---|---|---|---|
| JP | H05-121064 A | 5/1993 | | |
| JP | H07-226197 A | 8/1995 | | |
| JP | 11-016577 | 1/1999 | | |
| JP | 2012-01 4935 A | 1/2012 | | |
| JP | 2015-106534 A | 6/2015 | | |
| JP | 2016-195015 A | 11/2016 | | |
| JP | 2019-121433 A | 7/2019 | | |
| WO | PCT/KR2012/001697 | * 8/2012 | ......... | H01M 50/567 |
| WO | WO-2013032082 A1 | * 3/2013 | ......... | H01M 50/567 |
| WO | WO 2021/124797 A1 | 6/2021 | | |

* cited by examiner

*Primary Examiner* — Mark Ruthkosky

(74) *Attorney, Agent, or Firm* — Finnegan, Henderson, Farabow, Garrett & Dunner LLP

(57) ABSTRACT

In a power storage device, a plurality of electrode tabs includes a bent portion bent in a tab thickness direction. At least one of the electrode tabs constituting an electrode tab group has a shape that a tab width of a connection-side bent portion of bent portions, which is located on a side close to a tab connection portion, is smaller than a tab width of a tab connection portion including a bonded portion located on an inside in a tab width direction, the bonded portion being bonded to an electrode terminal directly or through another or other electrode tabs.

19 Claims, 7 Drawing Sheets

POWER STORAGE DEVICE

CROSS-REFERENCE TO RELATED APPLICATIONS

This application is based upon and claims the benefit of priority to Japanese Patent Application No. 2022-054448 filed on Mar. 29, 2022, the entire contents of which are incorporated herein by reference.

BACKGROUND

Technical Field

The present disclosure relates to a power storage device including a flat electrode body having a tab group in which electrode tabs overlap one another in a tab thickness direction, a case accommodating this electrode body, and an electrode terminal to which the tab group of the electrode body is bonded inside the case.

Related Art

Conventionally, there has been known a battery provided with a flat electrode body having a tab group consisting of electrode tabs overlapped in a tab thickness direction, a case, and an electrode terminal that extends from inside to outside of the case. For example, a battery configured as above is disclosed in Japanese unexamined patent application publication No. H11(1999)-016577, in FIG. 4 and others.

SUMMARY

Technical Problems

Meanwhile, if the above-mentioned battery is subjected to external shocks or vibrations, the electrode body may be caused to move within the case, resulting in damages, such as fissures or fractures, in the electrode tabs constituting the tab group. Particularly, when each electrode tab includes one or plural bent portions that bend or curve in the tab thickness direction, those electrode tabs are each liable to be torsionally deformed at a bent portion located closest to a bonded portion connected with the electrode terminal, which will also be referred to as a connection-side bent portion, resulting in damages such as fissures and fractures. Damages to the connection-side bent portion(s) of the electrode tab(s) will cause defects such as an increase in electrical resistance in the tab group.

The present disclosure has been made to address the above problems and has a purpose to provide a power storage device that can suppress the occurrence of defects such as an increase in electrical resistance in a tab group due to damages to the connection-side bent portions of the electrode tabs even when the power storage device is subjected to external shocks or vibrations.

Means of Solving the Problems

To achieve the above-mentioned purpose, one aspect of the present disclosure provides (1) a power storage device comprising: an electrode body having a flat shape and including a plurality of electrode sheets each having an electrode sheet body, and an electrode tab protruding from the electrode sheet body, in which the electrode tabs of the electrode sheets overlap one another in a tab thickness direction to form an electrode tab group; a case in which the electrode body is accommodated; and an electrode terminal that is fixedly provided to the case, extends from inside to outside of the case, and is bonded to the electrode tab group in the case, wherein each of the electrode tabs includes at least one bent portion bent in the tab thickness direction, the electrode tabs constituting the electrode tab group each include a tab connection portion including a bonded portion that is located on an inside in a tab width direction and bonded to the electrode terminal directly or through another or other electrode tabs, and the at least one bent portion includes a connection-side bent portion located close to the tab connection portion, and at least one of the electrode tabs constituting the electrode tab group has a shape in which a tab width (L2) of the connection-side bent portion is smaller than a tab width (L1) of the tab connection portion (L2<L1).

In the above-described power storage device, among the electrode tabs constituting one tab group, at least one electrode tab has a shape in which, when comparing the tab width between the own tab connection portion and the own connection-side bent portion, the tab width (L2) of the connection-side bent portion is smaller than the tab width (L1) of the tab connection portion; L2<L1. Accordingly, even if the electrode body is caused to move within the case due to shocks or vibrations externally applied to the power storage device, causing the electrode tabs to twist at the connection-side bent portions, the at least one electrode tab configured to satisfy the relationship of L2<L1 is more easily torsionally deformed at the connection-side bent portion, so that the stress generated therein can be reduced, as compared with an electrode tab not configured to satisfy L2<L1, for example, a conventional electrode tab configured to meet L1=L2. The above configuration can prevent damages such as fissures and fractures at the connection-side bent portion of the relevant electrode tab, and hence suppress the occurrence of defects such as an increase in electrical resistance in the tab group.

The electrode tab may include an electrode tab integrally formed with the electrode sheet body or an electrode tab separately formed from the electrode sheet body and joined thereto by welding. As the electrode tab, each electrode sheet may be provided with a single electrode tab or multiple electrode tabs.

(2) In the power storage device described in (1), furthermore, among the electrode tabs constituting the electrode tab group, at least an electrode tab with the connection-side bent portion bent with a smallest curvature radius has a shape in which the tab width (L2) of the connection-side bent portion is smaller than the tab width (L1) of the tab connection portion (L2<L1).

It has been found that, if a power storage device is subjected to external shocks and vibrations, among the connection-side bent portions of the electrode tabs constituting one tab group, the connection-side bent portion bent or curved with a smallest radius of curvature is most likely damaged. To address such defects, the foregoing power storage device is configured such that, among the electrode tabs constituting the tab group, at least the electrode tab having the connection-side bent portion bent with a smallest curvature radius has a shape that satisfies the above-described relationship of L2<L1, when comparing the tab width between the own tab connection portion and the own connection-side bent portion. This configuration can suppress the occurrence of damages at the connection-side bent portion that is most likely damaged, and thus can prevent the defects such as an increase in electrode resistance in the tab group.

(3) In the power storage device described in (1) or (2), furthermore, more than half of the electrode tabs constituting the electrode tab group each have a shape in which the tab width (L2) of the connection-side bent portion is smaller than the tab width (L1) of the tab connection portion (L2<L1).

In the above-described power storage device, more than half of the electrode tabs that constitute the tab group each have a shape that satisfies the above-described relationship of L2<L1, when comparing the tab width between the own tab connection portion and the own connection-side bent portion. This configuration can suppress the occurrence of damages at the connection-side bent portions of more than half of the electrode tabs, and thus can more effectively prevent the defects such as an increase in electrode resistance in the tab group.

Most preferably, the power storage device is configured such that all of the electrode tabs constituting the tab group each have the shape that satisfies the above-described relationship of L2<L1, i.e., a shape in which the tab width (L2) of each of the connection-side bent portions is smaller than the tab width (L1) of each of the tab connection portions, L2<L1.

(4) In the power storage device described in one of (1) to (3), furthermore, the at least one bent portion of each of the electrode tabs comprises a plurality of bent portions, the electrode tabs constituting the electrode tab group each further include a tab base portion, and the plurality of bent portions include a base-side bent portion located close to the tab base portion, and at least one of the electrode tabs constituting the electrode tab group has a shape in which a tab width (L4) of the base-side bent portion is smaller than a tab width (L3) of the tab base portion (L4<L3).

It has been found that, if the power storage device provided with the electrode tabs each including a plurality of bent portions is subjected to external shocks and vibrations, each electrode tab is twisted at not only the connection-side bent portion of the bent portions but also the base-side bent portion, easily causing damages such as fissures and fractures. To address such defects, the power storage device described above is configured such that, among the electrode tabs constituting one tab group, at least one electrode tab has a shape in which, when comparing the tab width between the own tab base portion and the own base-side bent portion, the tab width (L4) of the base-side bent portion is smaller than the tab width (L3) of the tab base portion; L4<L3. Accordingly, even if the electrode body is caused to move within the case due to shocks or vibrations externally applied to the power storage device, causing the electrode tabs to twist at the base-side bent portions, the electrode tabs configured to satisfy the relationship of L4<L3 is more easily torsionally deformed at the base-side bent portion and thus can reduce the stress generated therein, as compared with an electrode tab not configured to satisfy L4<L3, for example, a conventional electrode tab configured to meet L3=L4. This configuration can prevent damages such as fissures and fractures at the base-side bent portion of the relevant electrode tab, and hence suppress the occurrence of defects such as an increase in electrical resistance in the tab group.

(5) In the power storage device described in (4), furthermore, among the electrode tabs constituting the electrode tab group, at least an electrode tab with the base-side bent portion bent with a smallest curvature radius has a shape in which the tab width (L4) of the base-side bent portion is smaller than the tab width (L3) of the tab base portion (L4<L3).

It has been found that, if a power storage device is subjected to external shocks and vibrations, among base-side bent portions of the electrode tabs constituting one tab group, the base-side bent portion bent or curved with a smallest radius of curvature is most likely damaged. To address such defects, the foregoing power storage device is configured such that, among the electrode tabs constituting the tab group, at least the electrode tab having the base-side bent portion bent with a smallest curvature radius has a shape that satisfies the above-described relationship of L4<L3, when comparing the tab width between the own tab base portion and the own base-side bent portion. This configuration can suppress the occurrence of damages at the base-side bent portion that is most likely damaged, and thus can prevent the defects such as an increase in electrode resistance in the tab group.

(6) In the power storage device described in (4) or (5), furthermore, more than half of the electrode tabs constituting the electrode tab group each have a shape in which the tab width (L4) of the base-side bent portion is smaller than the tab width (L3) of the tab base portion (L4<L3).

In the above-described power storage device, more than half of the electrode tabs constituting the tab group each have a shape that satisfies the above-described relationship of L4<L3, when comparing the tab width between the own tab base portion and the own base-side bent portion. This configuration can suppress the occurrence of damages at the base-side bent portions of more than half of the electrode tabs, and thus can more effectively prevent the defects such as an increase in electrode resistance in the tab group.

Most preferably, the power storage device is configured such that all of the electrode tabs constituting the tab group each have the shape that satisfies the above-described relationship of L4<L3, i.e., in which the tab width (L4) of each of the base-side bent portions is smaller than the tab width (L3) of each of the tab base portions, L4<L3.

(7) In the power storage device described in one of (1) to (6), furthermore, the electrode body is accommodated in the case without being bound by the case in an electrode body thickness direction.

If the above-described power storage device is subjected to external shocks and vibrations, the electrode body is likely caused to move within a case in a thickness direction of the electrode body and in a perpendicular to that thickness direction, as compared with a power storage device in which an electrode body is bound in a thickness direction of the electrode body. Thus, the connection-side bent portion and the base-side bent portion of the electrode tab are likely damaged as described above. In such a power storage device, therefore, the electrode tab configured to satisfy the relationship of L2<L1 or configured to satisfy the relationships of L2<L1 and L4<L3 can particularly achieve a significant advantage of suppressing defects such as an increase in electrode resistance in the tab group.

(8) Furthermore, another aspect of the present disclosure provides a power storage device comprising: an electrode body having a flat shape and including a plurality of electrode sheets each having an electrode sheet body, and an electrode tab protruding from the electrode sheet body, in which the electrode tabs of the electrode sheets overlap one another in a tab thickness direction to form an electrode tab group; a case in which the electrode body is accommodated; and an electrode terminal that is fixedly provided to the case, extends from inside to outside of the case, and is bonded to the electrode tab group in the case, wherein each of the electrode tabs includes at least one bent portion bent in the tab thickness direction, the electrode tabs constituting the electrode tab group each include a tab connection portion including a bonded portion that is located on an inside in a tab width direction and bonded to the electrode terminal directly or through another or other electrode tabs, and the at least one bent portion includes a connection-side bent portion located close to the tab connection portion, and at least one of the electrode tabs constituting the electrode tab group has a shape in which a tab width of the connection-side bent portion is smaller than a tab width of the tab connection portion, wherein among the electrode tabs constituting the electrode tab group, at least an electrode tab with the connection-side bent portion bent with a smallest curvature radius has a shape in which the tab width of the connection-side bent portion is smaller than the tab width of the tab connection portion, wherein more than half of the electrode tabs constituting the electrode tab group each have a shape in which the tab width of the connection-side bent portion is smaller than the tab width of the tab connection portion, wherein the at least one bent portion of each of the electrode tabs comprises a plurality of bent portions, the electrode tabs constituting the electrode tab group each further include a tab base portion, the plurality of bent portions include a base-side bent portion located closest to the tab base portion, and at least one of the electrode tabs constituting the electrode tab group has a shape in which a tab width of the base-side bent portion is smaller than a tab width of the tab base portion, wherein among the electrode tabs constituting the electrode tab group, at least an electrode tab with the base-side bent portion bent with a smallest curvature radius has a shape in which the tab width of the base-side bent portion is smaller than the tab width of the tab base portion, wherein more than half of the electrode tabs constituting the electrode tab group each have a shape in which the tab width of the base-side bent portion is smaller than the tab width of the tab base portion, and wherein the electrode body is accommodated in the case without being bound by the case in an electrode body thickness direction.

DETAILED DESCRIPTION OF THE EXEMPLARY EMBODIMENTS

A detailed description of an embodiment of this disclosure will now be given referring to the accompanying drawings.

Figure 1:
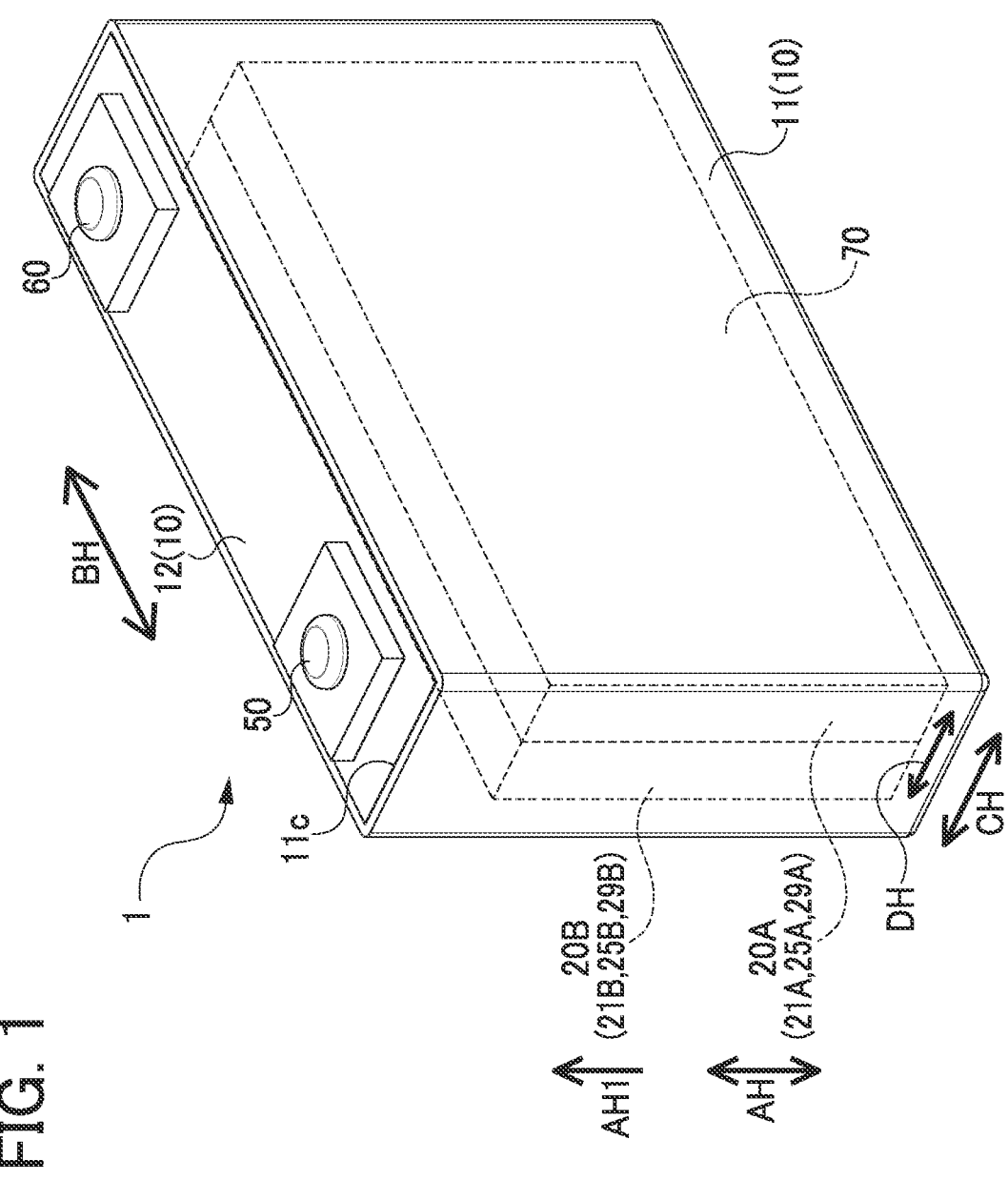
FIG. 1 is a perspective view of a battery in an embodiment.
Figure 2:
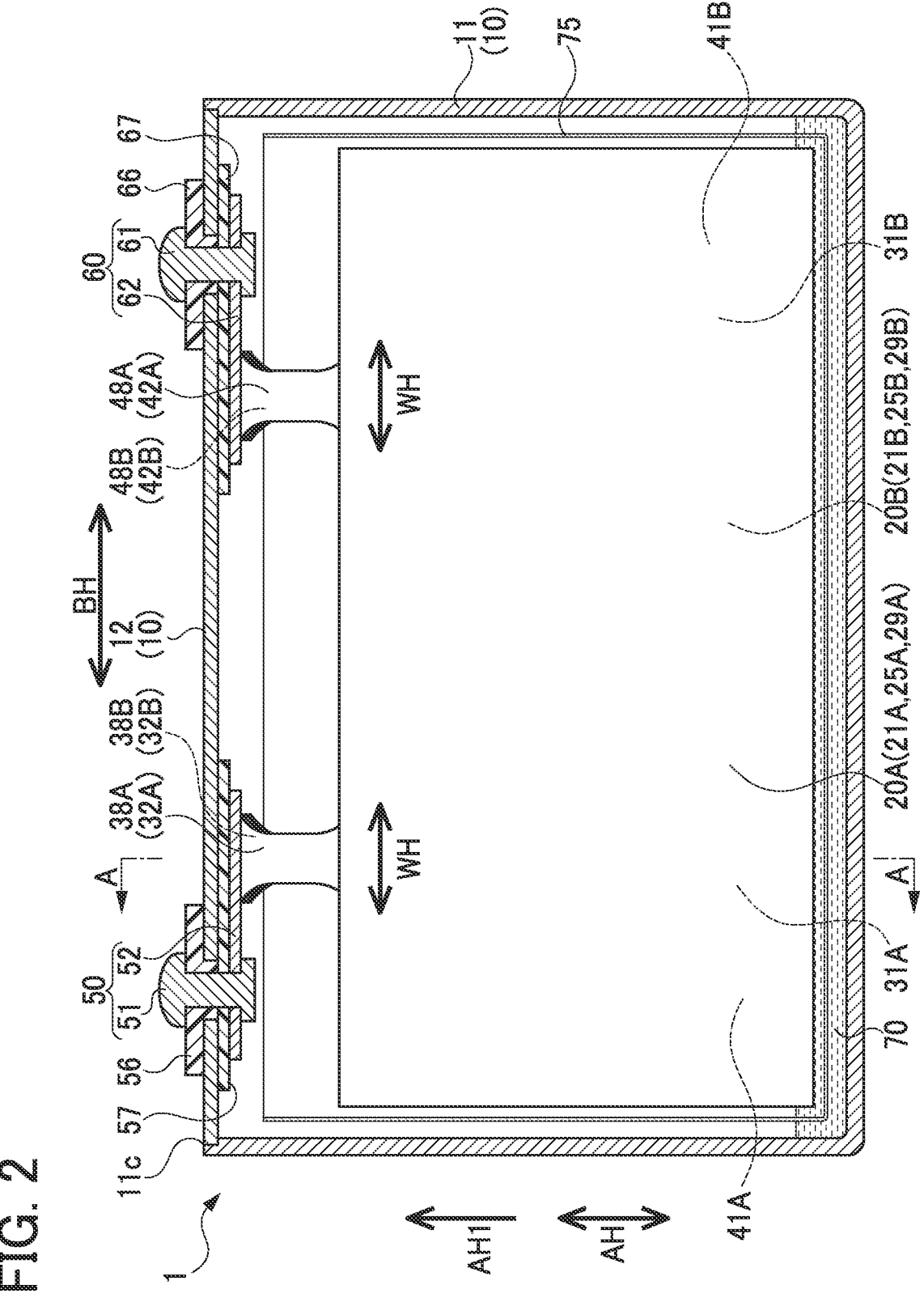
FIG. 2 is a cross-sectional view of the battery in a battery vertical direction and in a battery lateral direction in the embodiment.
Figure 3:
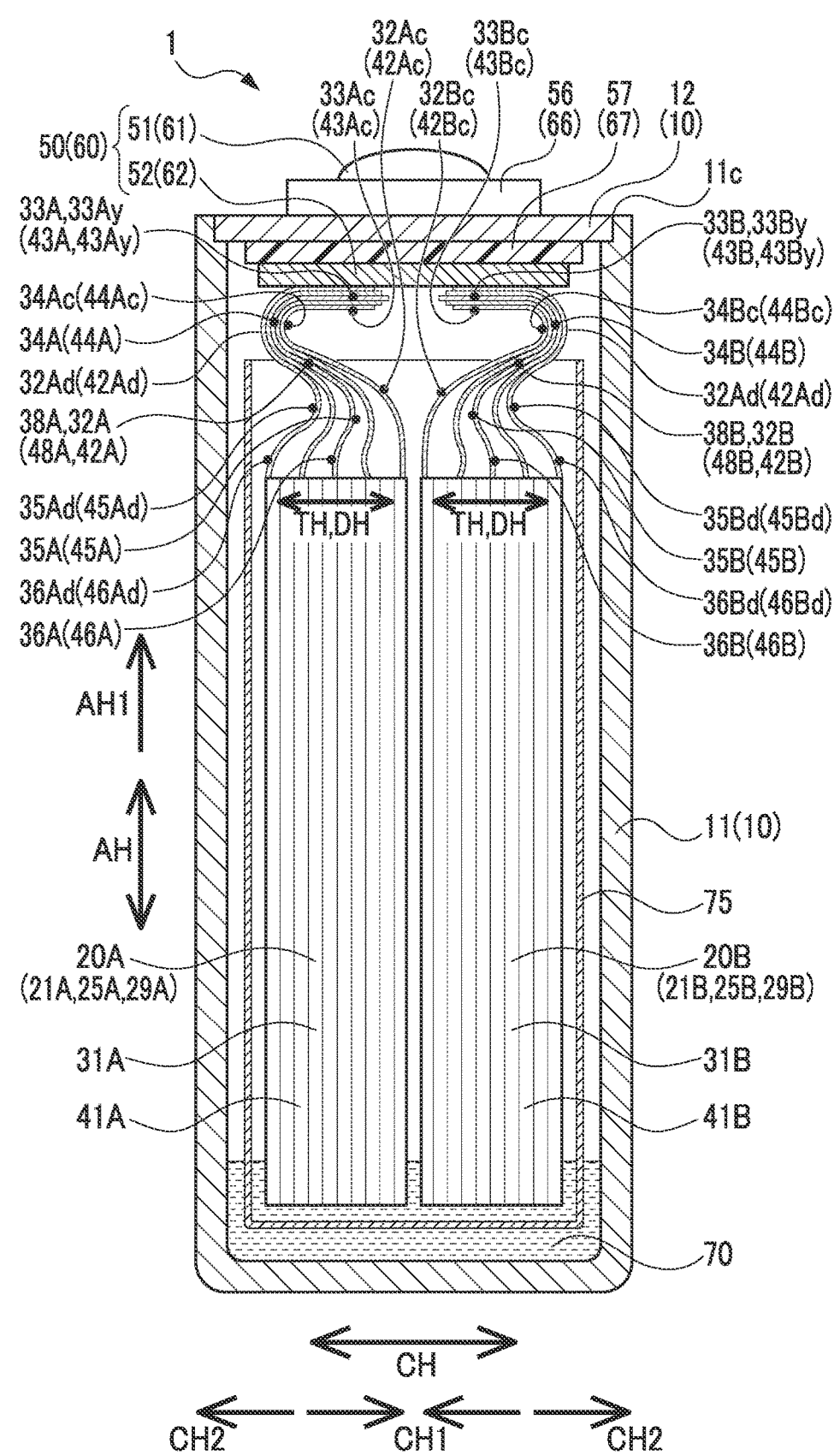
FIG. 3 is a cross-sectional view of the battery in the battery vertical direction and a battery thickness direction, taken along a line A-A in FIG. 2, in the embodiment.

FIG. 1 is a perspective view of a battery 1 in the present embodiment, which is one example of a power storage device of the present disclosure. FIGS. 2 and 3 are cross-sectional views of the battery 1. In the following description, the battery vertical direction AH, the battery lateral direction BH, and the battery thickness direction CH of the battery 1 are defined as indicated with arrows in FIGS. 1 to 3. This battery 1 is a rectangular, sealed lithium-ion secondary battery which can be mounted in a vehicle, such as a hybrid car, a plug-in hybrid car, and an electric car.

The battery 1 includes a case 10, a pair of electrode bodies 20A and 20B housed in the case 10, a positive terminal 50 and a negative terminal 60 each supported in the case 10, and others. The electrode bodies 20A and 21B are covered, within the case 10, with a pouch-shaped insulating film 75 opening on one side AH1 in the battery vertical direction AH. In the case 10, further, an electrolytic solution 70 is accommodated, a part of which is impregnated in the electrode bodies 20A and 20B, and another part of which is accumulated on the bottom wall of the case 10.

The case 10 has a rectangular parallelepiped box-like shape made of metal (e.g., aluminum in the present embodiment), including a case body 11 having a bottom-closed rectangular tubular shape with an opening 11*c* on the one side AH1 in the battery vertical direction AH, and a case lid 12 having a rectangular plate shape welded to the case body 11 to close the opening 11*c*.

The case lid 12 is fixedly provided with the positive terminal 50 made of aluminum through insulating members 56 and 57, and the positive terminal 50 extends from inside to outside of the case 10. This positive terminal 50 includes an inner terminal member 52 having a rectangular plate shape placed inside the case 10, and an outer terminal member 51 that is connected by swaging to the inner terminal member 52 and extends from the inside to the outside of the case 10. To the inner terminal member 52, a positive electrode tab group 38A of the electrode body 20A and a positive tab group 38B of the electrode body 20B are both bonded and electrically conducted.

Furthermore, the case lid 12 is fixedly provided with the negative terminal 60 made of copper through insulating members 66 and 67, and the negative terminal 60 extends from inside to outside of the case 10. This negative terminal 60 includes an inner terminal member 62 having a rectangular plate shape placed inside the case 10, and an outer terminal member 61 that is connected by swaging to the inner terminal member 62 and extends from the inside to the outside of the case 10. To the inner terminal member 62, a negative electrode tab group 48A of the electrode body 20A and a negative electrode tab group 48B of the electrode body 20B are both bonded and electrically conducted.

Figure 4:
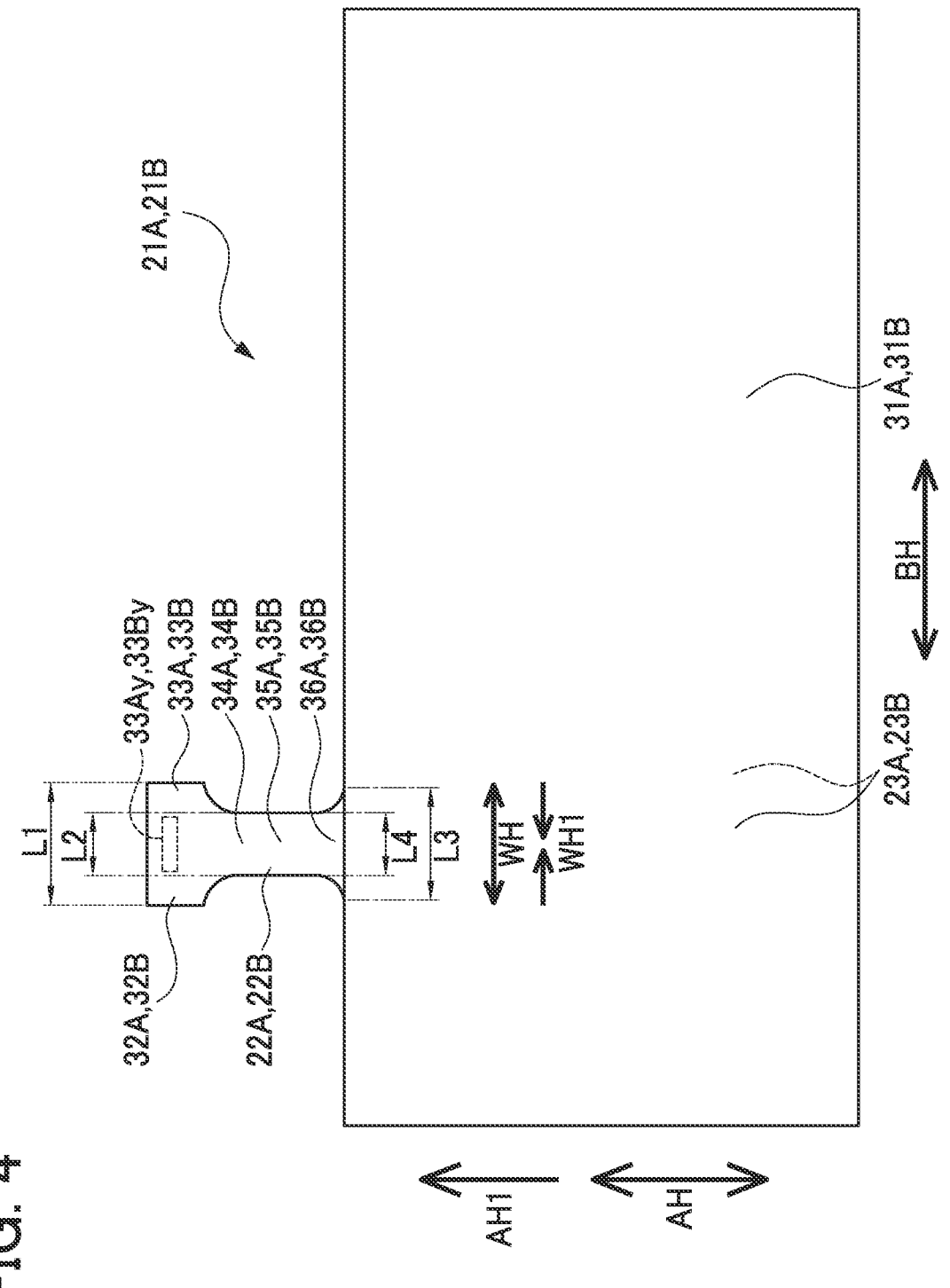
FIG. 4 is a plan view of a positive electrode sheet in the embodiment.
Figure 5:
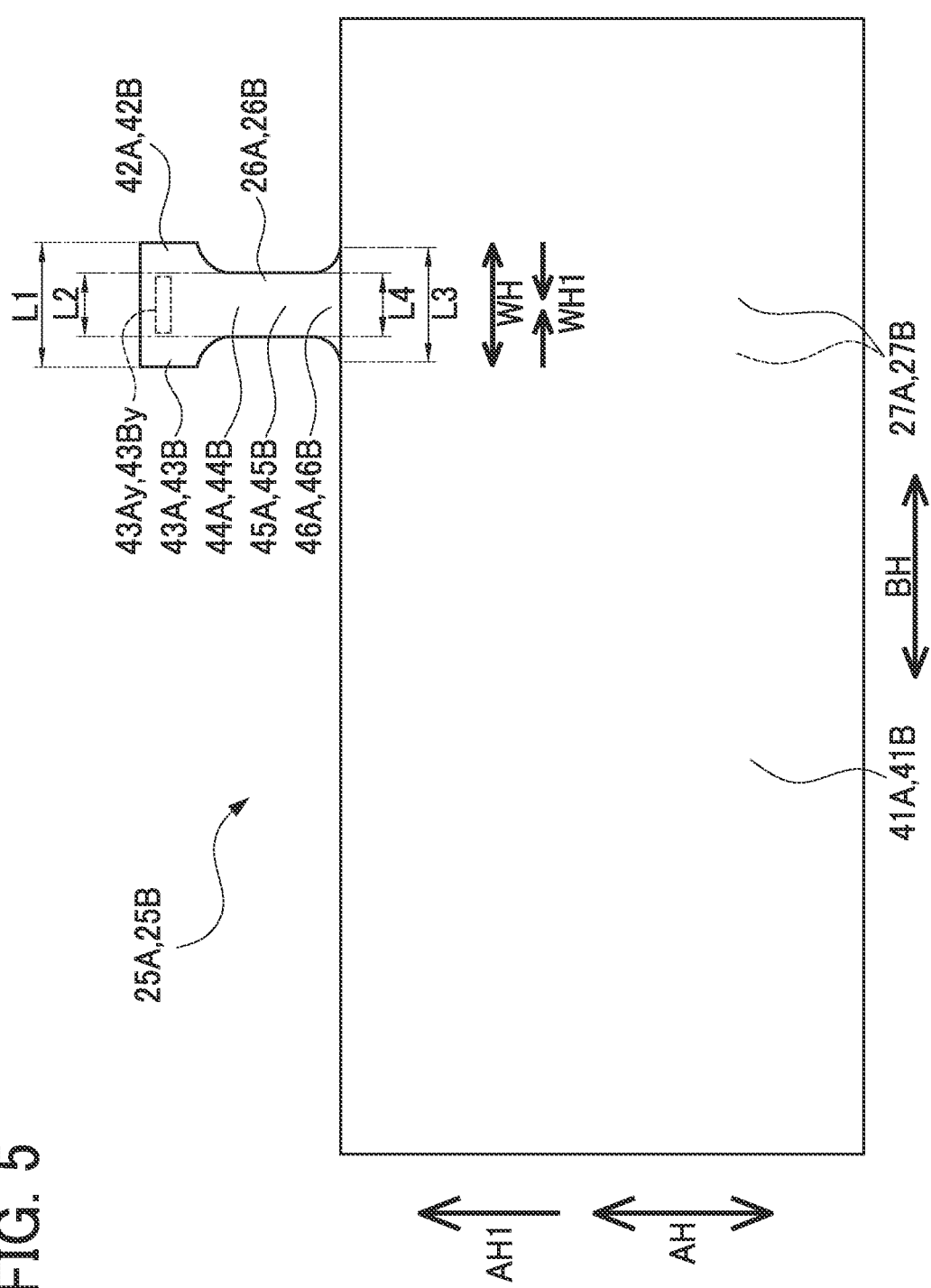
FIG. 5 is a plan view of a negative electrode sheet in the embodiment.

The two electrode bodies 20A and 20B are stacked in the electrode body thickness direction DH and accommodated in the case 10. However, the electrode bodies 20A and 20B accommodated in the case 10 are not bound by the case 10 in the electrode body thickness direction DH, but are spaced apart from the case 10. The two electrode bodies 20A and 20B are identical in structure, and thus only the electrode body 20A will be described below, accompanied by reference signs of corresponding components or parts of the electrode body 20B in parentheses. The electrode body 20A (20B) is a laminated electrode body having a flat, rectangular parallelepiped shape, in which a plurality of rectangular positive electrode sheets 21A (21B) and a plurality of rectangular negative electrode sheets 25A (25B) are alternately stacked with separators 29A (29B) formed of resin porous films interposed therebetween. The positive electrode sheets 21A (21B) and the negative electrode sheets 25A (25B) are one examples of electrode sheets of the present disclosure. FIG. 4 is a plan view of the positive electrode sheet 21A (21B) and FIG. 5 is a plan view of the negative electrode sheet 25A (25B). The positive electrode sheets 21A (21B) and the separators 29A (29B), overlapping in the electrode body thickness direction DH, are bonded to each other with adhesive, and similarly, the negative electrode sheets 25A (25B) and the separators 29A (29B), overlapping in the electrode body thickness direction DH, are bonded to each other with adhesive. Accordingly, the positive electrode sheets 21A (21B), the negative electrode sheets 25A (25B), and the separators 29A (29B), constituting the electrode body 20A (20B), are integrated together.

Each of the positive electrode sheets 21A (21B) (see FIG. 4) includes a rectangular plate-shaped positive electrode sheet body 31A (31B) and a positive electrode tab 32A (32B) protruding out on the one side AH1 in the battery vertical direction AH, i.e., upward in FIG. 4, from the positive electrode sheet body 31A (31B). The positive electrode sheet body 31A (32B) and the positive electrode tab 32A (32B) are one examples of an electrode sheet body and an electrode tab of the present disclosure, respectively. The positive electrode sheet body 31A (31B) includes a positive current collecting foil 22A (22B) made of an aluminum foil and positive active material layers 23A (23B) provided on both main surfaces of the foil 22A (22B). The positive electrode tab 32A (32B) is an extended part of the positive current collecting foil 22A (22B) extending on the one side AH1 in the battery vertical direction AH, the positive current collecting foil 22A (22B) being exposed in the tab thickness direction TH without being coated with the positive active material layers 23A (23B) in the tab thickness direction TH.

The positive electrode tabs 32A (32B) of the positive electrode sheets 21A (21B) included in the electrode body 20A (20B) overlap one another in the tab thickness direction TH, forming the positive electrode tab group 38A (38B), as shown in FIG. 3. This positive electrode tab group 38A (38B) is bonded to the positive terminal 50 inside the case 10 by ultrasonic welding directly or through another or other positive electrode tabs 32A (32B). In the present embodiment, each of the positive electrode tabs 32A (32B) is an S-shaped electrode tab having two bent portions that bend in the tab thickness direction TH, and includes a tab connection portion 33A (33B), a tab base portion 36A (36B), and a connection-side bent portion 34A (34B) and a base-side bent portion 35A (35B) which join those tab connection portion 33A (33B) and tab base portion 36A (36B). The connection-side bent portion 34A (34B) and the base-side bent portion 35A (35B) are one examples of a bent portion of the present disclosure.

The tab base portion 36A (36B) is a proximal end part of the protruding positive electrode tab 32A (32B) and is continuous with the positive electrode sheet body 31A (31B) and the base-side bent portion 35A (35B) (see FIG. 4).

In contrast, the tab connection portion 33A (33B) is a distal end part of the protruding positive electrode tab 32A (32B) and includes a welded portion 33Ay (33By) that is located on the inside WH1 in the tab width direction WH and bonded to the positive terminal 50 directly or through another or other positive electrode tabs 32A (32B). The welded portion 33Ay (33By) is one example of a bonded portion of the present disclosure.

The positive electrode tab 32A (32B) in the present embodiment has two bent portions (see FIG. 3) as described above, that is, the base-side bent portion 35A (35B) and the connection-side bent portion 34A (34B). The base-side bent portion 35A (35B) is a bend located closer to the tab base portion 36A (36B) relative to the connection-side bent portion 34A (34B), i.e., positioned on the proximal end side of the positive electrode tab 32A (32B). Specifically, this base-side bent portion 35A has a shape that extends from the tab base portion 36A (36B) toward the inside CH1 in the battery thickness direction CH, and bends in a U-shape to the outside CH2 in the battery thickness direction CH.

In contrast, the connection-side bent portion 34A (34B) is a bend located closer to the tab connection portion 33A (33B) relative to the base-side bent portion 35A (35B), i.e., positioned on the distal end side of the positive electrode tab 32A (32B). Specifically, this connection-side bent portion 34A (34B) has a shape that extends from the base-side bent portion 35A (35B) toward the outside CH2 in the battery thickness direction CH, and bends in a U-shape to the inside CH1 in the battery thickness direction CH toward the tab connection portion 33A (33B).

In the battery 1, among the positive electrode tabs 32A (32B) constituting the positive electrode tab group 38A (38B), at least one positive electrode tab 32A (32B) has a shape in which the tab width L2 of the connection-side bent portion 34A (34B) is smaller than the tab width L1 of the tab connection portion 33A (33B), i.e., a shape that satisfies a relationship of L2<L1 (see FIG. 4). Accordingly, even if the electrode body 20A (20B) is caused to move within the case 10 due to external shocks or vibrations externally applied to the battery 1, causing the positive electrode tabs 32A (32B) to twist at the connection-side bent portions 34A (34B), the positive electrode tab 32A (32B) configured to satisfy L2<L1 is more easily torsionally deformed at the connection-side bent portion 34A (34B), so that the stress generated therein can be reduced, as compared with a battery incorporating positive electrode tabs not configured to satisfy L2<L1. The battery 1 configured as above can therefore prevent damages such as fissures and fractures at the connection-side bent portion 34A (34B) of the relevant positive electrode tab 32A (32B), and hence suppress the occurrence of defects such as an increase in electrical resistance in the positive electrode tab group 38A (38B).

In the present embodiment, particularly, among the positive electrode tabs 32A (32B) of the positive electrode tab group 38A (38B), a positive electrode tab 32Ac (32Bc) with a connection-side bent portion 34Ac (34Bc) bent with a smallest curvature radius, corresponding to a positive electrode tab located on the most inside CH1 in the battery thickness direction CH, has a shape in which the tab width L2 of the connection-side bent portion 34Ac (34Bc) is smaller than the tab width L1 of the tab connection portion 33Ac (33Bc), L2<L1, when comparing between the own tab connection portion 33Ac (33Bc) and the own connection-side bent portion 34Ac (34Bc). This can suppress the occurrence of damages to the connection-side bent portion 34Ac (34Bc) that is most likely damaged.

In the present embodiment, furthermore, more than half, and even all, of the positive electrode tabs 32A (32B) that constitute the positive electrode tab group 38A (38B) each have a shape in which the tab width L2 of the connection-side bent portion 34A (34B) is smaller than the tab width L1 of the tab connection portion 33A (33B), L2<L1, when comparing between the own tab connection portion 33A (33B) and the own connection-side bent portion 34A (34B). This can prevent damages to the connection-side bent portions 34A (34B) of more than half, and even all, of the positive electrode tabs 32A (32B).

In the battery 1, among the positive electrode tabs 32A (32B) constituting the positive electrode tab group 38A (38B), at least one positive electrode tab 32A (32B) has a shape in which the tab width L4 of the base-side bent portion 35A (35B) is smaller than the tab width L3 of the tab base portion 36A (36B), i.e., a shape that satisfies a relationship of L4<L3. Accordingly, even if the positive electrode tab 32A (32B) is twisted at the base-side bent portion 35A (35B) due to external shocks or vibrations applied to the battery 1, the positive electrode tab 32A (32B) configured to satisfy L4<L3 is more easily torsionally deformed at the base-side bent portion 35A (35B), so that the stress generated therein can be reduced, as compared with a battery incorporating positive electrode tabs not configured to satisfy L4<L3. The battery 1 configured as above can therefore prevent damages such as fissures and fractures at the base-side bent portion 35A (35B) of the positive electrode tab 32A (32B), and hence suppress the occurrence of defects such as an increase in electrical resistance in the positive electrode tab group 38A (38B).

In the present embodiment, particularly, among the positive electrode tab 32A (32B) constituting the positive electrode tab group 38A (38B), a positive electrode tab 32Ad (32Bd) with a base-side bent portion 35Ad (35Bd) bent with a smallest curvature radius, which is a positive electrode tab located on the most outside CH2 in the battery thickness direction CH, has a shape in which the tab width L4 of the base-side bent portion 35Ad (35Bd) is smaller than the tab width L3 of the tab base portion 36Ad (36Bd), L4<L3, when comparing between the own tab base portion 36Ad (36Bd) and the own base-side bent portion 35Ad (35Bd). This can suppress the occurrence of damages to the base-side bent portion 35Ad (35Bd) that is most likely damaged.

In the present embodiment, furthermore, more than half, and even all, of the positive electrode tabs 32A (32B) that constitute the positive electrode tab group 38A (38B) each have a shape in which the tab width L4 of the base-side bent portion 35A (35B) is smaller than the tab width L3 of the tab base portion 36A (36B), L4<L3, when comparing between the own tab base portion 36A (36B) and the own base-side bent portion 35A (35B). This can suppress the occurrence of damages to the base-side bent portion 35A (35B) of more than half, and even all, of the positive electrode tabs 32A (32B).

In the present embodiment, the electrode body 20A (20B) is not bound by the case 10 in the electrode body thickness direction DH. Accordingly, if the battery 1 is subjected to shocks or vibrations, the electrode body 20A (20B) is more liable to move within the case 10 in the electrode body thickness direction DH, i.e., the battery thickness direction CH, and a direction perpendicular thereto, i.e., the battery vertical direction AH and the battery lateral direction BH, as compared with a battery with an electrode body bound by the case in an electrode body thickness direction. Thus, the connection-side bent portion 34A (34B) and the base-side bent portion 35A (35B) of each positive electrode tab 32A (32B) are easily damaged. To avoid such defects, the battery 1 is configured such that the positive electrode tab 32A (32B) has a shape that satisfies the relationship of L2<L1 or the relationships of L2<L1 and L4<L3, and thus can significantly suppress the occurrence of defects such as an increase in the electrode resistance in the positive electrode tab group 38A (38B).

Next, the negative electrode sheets 25A (25B) will be described referring to FIG. 5. The negative electrode sheets 25A (25B), negative electrode tabs 42A (42B), and a negative electrode tab group 48A (48B) are almost identical in structure respectively to the positive electrode sheets 21A (21B), the positive electrode tabs 32A (32B), and the positive electrode tab group 38A (38B), and therefore they will be described below in a simplified manner. Each of the negative electrode sheets 25A (25B) includes a negative electrode sheet body 41A (41B), and a negative electrode tab 42A (42B) protruding from the negative electrode sheet body 41A (41B). The negative electrode sheet body 41A (41B) and the negative electrode tab 42A (42B) are one examples of an electrode sheet body and an electrode tab of the present disclosure, respectively. The negative electrode sheet body 41A (41B) includes a negative current collecting foil 26A (26B) made of a copper foil and negative active material layers 27A (27B) provided on both main surfaces of the foil 26A (26B). The negative electrode tab 42A (42B) is an extended part of the negative current collecting foil 26A (26B) extending on the one side AH1 in the battery vertical direction AH, the negative current collecting foil 26A (26B) being exposed in the tab thickness direction TH.

The negative electrode tabs 42A (42B) of the negative electrode sheets 25A (25B) included in the electrode body 20A (20B) overlap one another in the tab thickness direction TH, forming the negative electrode tab group 48A (48B), which is bonded to the negative terminal 60 inside the case 10, as shown in FIG. 3. Each of the negative electrode tabs 42A (42B) includes a tab connection portion 43A (43B), a tab base portion 46A (46B), and a connection-side bent portion 44A (44B) and a base-side bent portion 45A (45B) which join those tab connection portion 43A (43B) and tab base portion 46A (46B). The connection-side bent portion 44A (44B) and the base-side bent portion 45A (45B) are one example of the bent portion of the present disclosure. The tab connection portion 43A (43B) includes a welded portion 43Ay (43By) that is located on the inside WH1 in the tab width direction WH and bonded to the negative terminal 60 directly or through another or other negative electrode tabs 42A (42B). The welded portion 43Ay (43By) is one example of the bonded portion of the present disclosure.

In the battery 1, among the negative electrode tabs 42A (42B) constituting the negative electrode tab group 48A (48B), at least one negative electrode tab 42A (42B) has a shape in which the tab width L2 of the connection-side bent portion 44A (44B) is smaller than the tab width L1 of the tab connection portion 43A (43B), i.e., a shape that satisfies a relationship of L2<L1 (see FIG. 5). Accordingly, even if the negative electrode tab 42A (42B) is twisted at the connection-side bent portion 44A (44B) due to external shocks or vibrations externally applied to the battery 1, the negative electrode tab 42A (42B) configured to satisfy L2<L1 is more easily torsionally deformed at the connection-side bent portion 44A (44B), so that the stress generated therein can be reduced, as compared with a negative electrode tab not configured to satisfy L2<L1. The battery 1 configured as above can therefore prevent damages such as fissures and fractures at the connection-side bent portion 44A (44B) of the relevant negative electrode tab 42A (42B), and hence suppress the occurrence of defects such as an increase in electrical resistance in the negative electrode tab group 48A (48B).

In the present embodiment, particularly, among the negative electrode tabs 42A (42B) of the negative electrode tab group 48A (48B), a negative electrode tab 42Ac (42Bc) with a connection-side bent portion 44Ac (44Bc) bent with a smallest curvature radius, corresponding to a negative electrode tab located on the most inside CH1 in the battery thickness direction CH, has a shape in which the tab width L2 of the connection-side bent portion 44Ac (44Bc) is smaller than the tab width L1 of the tab connection portion 43Ac (43Bc), L2<L1. This can suppress the occurrence of damages to the connection-side bent portion 44Ac (44Bc) that is most likely damaged.

In the present embodiment, furthermore, more than half, and even all, of the negative electrode tabs 42A (42B) that constitute the negative electrode tab group 48A (48B) each have a shape in which the tab width L2 of the connection-side bent portion 44A (44B) is smaller than the tab width L1 of the tab connection portion 43A (43B), L2<L1. This can prevent damages to the connection-side bent portions 44A (44B) of more than half, and even all, of the negative electrode tabs 42A (42B).

In the battery 1, among the negative electrode tabs 42A (42B) constituting the negative electrode tab group 48A (48B), at least one negative electrode tab 42A (42B) has a shape in which the tab width L4 of the base-side bent portion 45A (45B) is smaller than the tab width L3 of the tab base portion 46A (46B), i.e., a shape that satisfies a relationship of L4<L3. Accordingly, even if the negative electrode tab 42A (42B) is twisted at the base-side bent portion 45A (45B) due to external shocks or vibrations applied to the battery 1, the negative electrode tab 42A (42B) configured to satisfy L4<L3 is more easily torsionally deformed at the base-side bent portion 45A (45B), so that the stress generated therein can be reduced, as compared with a battery incorporating a negative electrode tab not configured to satisfy L4<L3. The battery 1 configured as above can therefore prevent damages such as fissures and fractures at the base-side bent portion 45A (45B) of the negative electrode tab 42A (42B), and hence suppress the occurrence of defects such as an increase in electrical resistance in the negative electrode tab group 48A (48B).

In the present embodiment, particularly, among the negative electrode tabs 42A (42B) constituting the negative electrode tab group 48A (48B), a negative electrode tab 42Ad (42Bd) with a base-side bent portion 45Ad (45Bd) bent with a smallest curvature radius, which is a negative electrode tab located on the most outside CH2 in the battery thickness direction CH, has a shape in which the tab width L4 of the base-side bent portion 45Ad (45Bd) is smaller than the tab width L3 of the tab base portion 46Ad (46Bd), L4<L3. This can suppress the occurrence of damages to the base-side bent portion 45Ad (45Bd) that is most likely damaged.

In the present embodiment, furthermore, more than half, and even all, of the negative electrode tabs 42A (42B) that constitute the negative electrode tab group 48A (48B) each have a shape in which the tab width L4 of the base-side bent portion 45A (45B) is smaller than the tab width L3 of the tab base portion 46A (46B), L4<L3. This can suppress the occurrence of damages to the base-side bent portion 45A (45B) of more than half, and even all, of the negative electrode tab 42A (42B).

In the present embodiment, the electrode body 20A (20B) is not bound by the case 10 in the electrode body thickness direction DH. Accordingly, the electrode body 20A (20B) is liable to move within the case 10, which likely causes damages to the connection-side bent portion 44A (44B) and the base-side bent portion 45A (45B) of each negative electrode tab 42A (42B). To avoid such defects, the battery 1 is configured such that the negative electrode tab 42A (42B) has a shape that satisfies the relationship of L2<L1 or the relationships of L2<L1 and L4<L3, and thus can significantly suppress the occurrence of defects such as an increase in the electrode resistance in the negative electrode tab group 48A (48B).

Next, a method for producing the above-described battery 1 will be described below. Firstly, the positive electrode sheets 21A (21B) and the negative electrode sheets 25A (25B) are alternately laminated, or stacked, with the separators 29A (29B) interposed therebetween to form the electrode body 20A (20B). Separately, the positive terminal 50 and the negative terminal 60 are fixed to the case lid 12.

Figure 6:
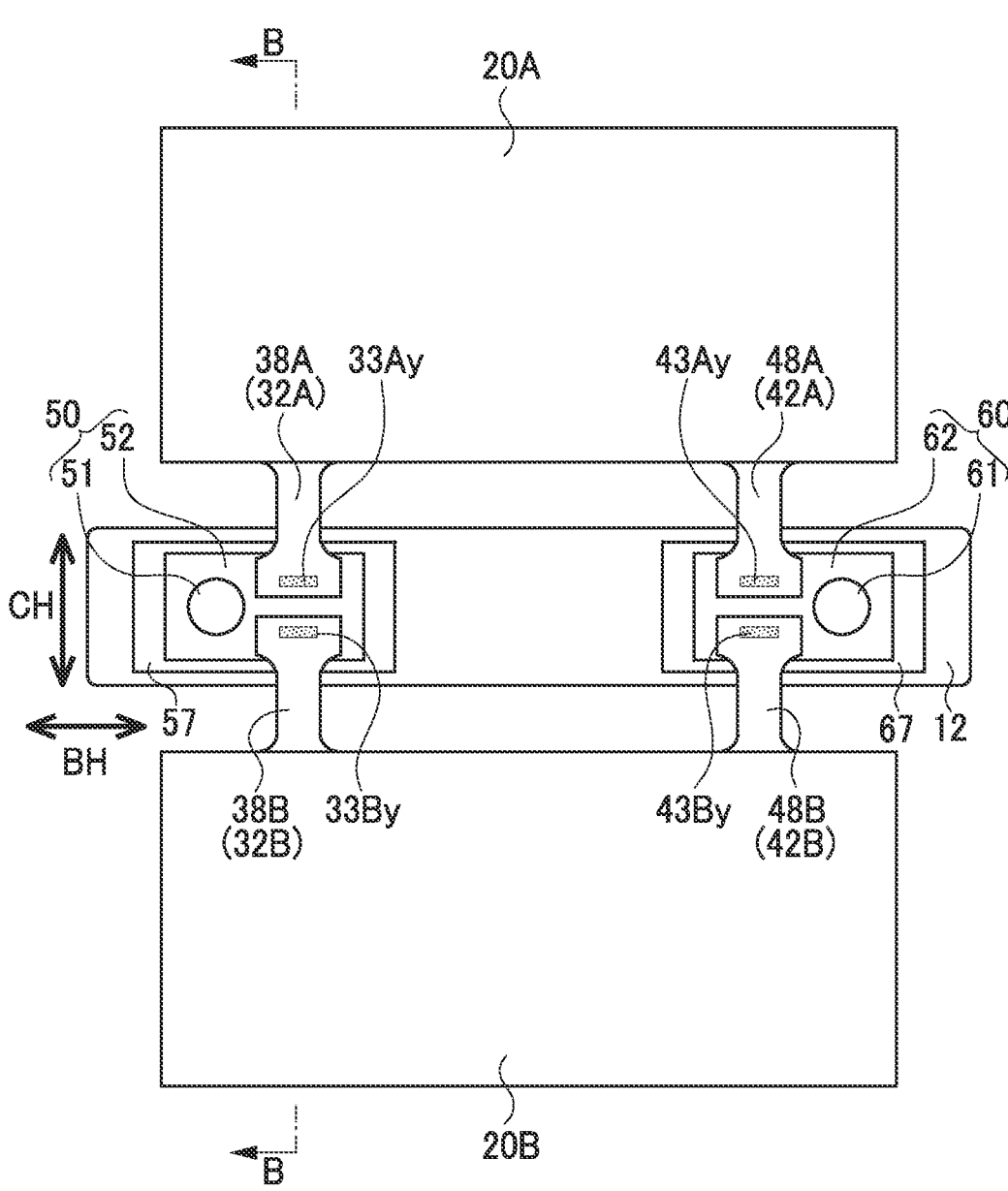
FIG. 6 is a plan view showing that positive tab groups and negative tab groups of two electrode bodies are respectively welded to a positive terminal and a negative terminal in a method for producing a battery in the embodiment.
Figure 7:
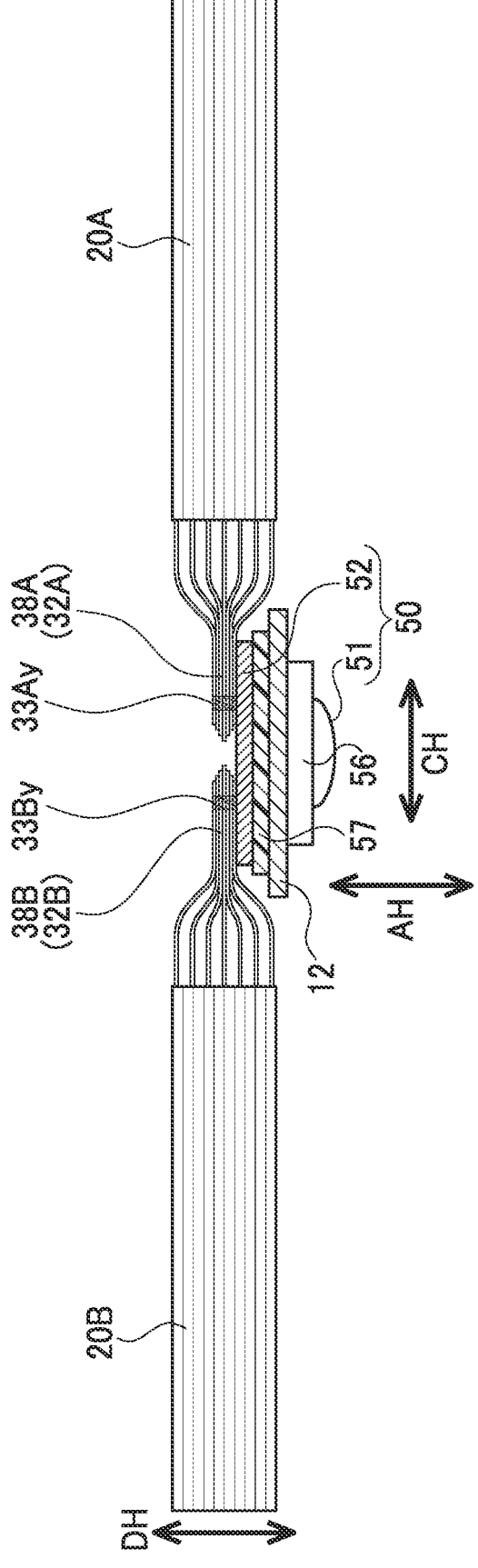
FIG. 7 is a cross sectional view taken along a line B-B in FIG. 6, showing that the positive tab groups and the negative tab groups of two electrode bodies are respectively welded to the positive terminal and the negative terminal in the method for producing a battery in the embodiment.

Subsequently, the positive electrode tabs 32A (32B) and the negative electrode tabs 42A (42B) included in the electrode body 20A (20B) are separately overlapped in the tab thickness direction TH, respectively forming the positive electrode tab group 38A (38B) and the negative electrode tab group 48A (48B). Then, the tab connection portions 33A (33B) of the positive electrode tab group 38A (38B) and the tab connection portions 43A (43B) of the negative electrode tab group 48A (48B) are respectively welded to the positive terminal 50 and the negative terminal 60 fixed to the case lid 12 (see FIGS. 6 and 7). Thereafter, the positive electrode tab groups 38A and 38B and the negative electrode tab groups 48A and 48B are each bent in an S-shaped curve and further the two electrode bodies 20A and 20B are stacked in the electrode body thickness direction DH as shown in FIG. 3.

The electrode bodies 20A and 20B are enclosed together in the pouch-shaped insulating film 75. These electrode bodies 20A and 20B covered with the insulating film 75 are inserted in the case body 11, and then the opening 11c of this case body 11 is closed with the case lid 12. The case body 11 and the case lid 12 are welded to each other over the entire circumference of the case lid 12, completing the case 10. Successively, the electrolytic solution 70 is injected into the case 10 through an injection port not shown, and then this injection port is sealingly closed with a seal member not shown. This battery 1 is subsequently subjected to initial charging, aging, various inspections, and others to finish the battery 1.

The present disclosure is described in the foregoing embodiment, but is not limited thereto. The present disclosure may be embodied in other specific forms without departing from the essential characteristics thereof.

For example, the foregoing embodiment exemplifies the battery 1 provided with two electrode bodies 20A and 20B housed in the case 10; however, the number of electrode bodies accommodated in the case may be one or three or more. Further, the above embodiment exemplifies the battery 1 provided with the laminated electrode bodies 20A and 20B, but these electrode bodies may be flat wound electrode bodies.

Further, the foregoing embodiment shows the battery 1 with the case 10 made of metal; however, the case for accommodating an electrode body or bodies is not limited thereto but may be formed of a laminated film or the like.

REFERENCE SIGNS LIST

1 Battery (Power storage device)
10 Case
20A, 20B Electrode body
21A, 21B Positive electrode sheet (Electrode sheet)
25A, 25B Negative electrode sheet (Electrode sheet)
31A, 31B Positive electrode sheet body (Electrode sheet body)
32A, 321B Positive electrode tab (Electrode tab)
32Ac, 32Bc Positive electrode tab (Electrode tab, with a connection-side bent portion having a smallest curvature radius)

32Ad,32Bd Positive electrode tab (Electrode tab, with a base-side bent portion having a smallest curvature radius)

34A, 34B, 33Ac, 33Bc Tab connection portion

33Ay, 33By Welded portion (Bonded portion)

34A, 34B Connection-side bent portion (Bent portion)

34Ac, 34Bc Connection-side bent portion (Bent portion, having a smallest curvature radius)

35A, 35B Base-side bent portion (Bent portion)

35Ad, 35Bd Base-side bent portion (Bent portion, having a smallest curvature radius)

36A, 36B, 36Ad, 36Bd Tab base portion 38A, 38B Positive electrode tab group (Tab group)

41A, 41B Negative electrode sheet body (Electrode body)

42A, 42B Negative electrode tab (Electrode tab)

42Ac, 42Bc Negative electrode tab (Electrode tab, with a connection-side bent portion having a smallest curvature radius)

42Ad, 42Bd Negative electrode tab (Electrode tab, with a base-side bent portion having a smallest curvature radius)

43A, 43B, 43Ac, 43Bc Tab connection portion

43Ay, 43By Welded portion (Bonded portion)

44A, 44B Connection-side bent portion (Bent portion)

44Ac, 44Bc Connection-side bent portion (Bent portion, having a smallest curvature radius)

45A, 45B Base-side bent portion (Bent portion)

45Ad,45Bd Base-side bent portion (Bent portion, having a smallest curvature radius)

46A, 46B, 46Ad, 46Bd Tab base portion 48A, 48B Negative electrode tab group (Tab group)

50 Positive terminal

60 Negative terminal

TH Tab thickness direction

WH Tab width direction

WH1 Inside in tab width direction

L1 Tab width (of tab connection portion)

L2 Tab width (of connection-side bent portion)

L3 Tab width (of tab base portion)

L4 Tab width (of base-side bent portion)

What is claimed is:

1. A power storage device comprising:

an electrode body having a flat shape and including a plurality of electrode sheets each having an electrode sheet body, and an electrode tab protruding from the electrode sheet body, in which the electrode tabs of the electrode sheets overlap one another in a tab thickness direction to form an electrode tab group, wherein the tab thickness direction is perpendicular to both a tab width direction and a direction in which the electrode tab protrudes from the electrode sheet body;

a case in which the electrode body is accommodated; and an electrode terminal that is fixedly provided to the case, extends from inside to outside of the case, and is bonded to the electrode tab group in the case, wherein each of the electrode tabs includes a plurality of bent portions bent in the tab thickness direction, the electrode tabs constituting the electrode tab group each include a tab connection portion including a bonded portion that is located on an inside in the tab width direction and bonded to the electrode terminal directly or through another or other electrode tabs, and the at least one bent portion includes a connection-side bent portion located close to the tab connection portion, the electrode tabs constituting the electrode tab group each further include a tab base portion, the plurality of bent portions include a base-side bent portion located closest to the tab base portion, among the plurality of bent portions, the connection-side bent portion and the base-side bent portion are bent in opposite directions in the tab thickness direction, forming an S-shaped electrode tab, at least one of the electrode tabs constituting the electrode tab group has a shape in which a tab width of the connection-side bent portion is smaller than a tab width of the tab connection portion, and at least one of the electrode tabs constituting the electrode tab group has a shape in which a tab width of the base-side bent portion is smaller than a tab width of the tab base portion.

2. The power storage device according to 1, wherein among the electrode tabs constituting the electrode tab group, at least an electrode tab with the connection-side bent portion bent with a smallest curvature radius has a shape in which the tab width of the connection-side bent portion is smaller than the tab width of the tab connection portion.

3. The power storage device according to claim 1, wherein more than half of the electrode tabs constituting the electrode tab group each have a shape in which the tab width of the connection-side bent portion is smaller than the tab width of the tab connection portion.

4. The power storage device according to claim 2, wherein more than half of the electrode tabs constituting the electrode tab group each have a shape in which the tab width of the connection-side bent portion is smaller than the tab width of the tab connection portion.

5. The power storage device according to claim 2, wherein the at least one bent portion of each of the electrode tabs comprises a plurality of bent portions, the electrode tabs constituting the electrode tab group each further include a tab base portion, the plurality of bent portions include a base-side bent portion located closest to the tab base portion, and at least one of the electrode tabs constituting the electrode tab group has a shape in which the tab width of the base-side bent portion is smaller than the tab width of the tab base portion.

6. The power storage device according to claim 3, wherein the at least one bent portion of each of the electrode tabs comprises a plurality of bent portions, the electrode tabs constituting the electrode tab group each further include a tab base portion, the plurality of bent portions include a base-side bent portion located closest to the tab base portion, and at least one of the electrode tabs constituting the electrode tab group has a shape in which the tab width of the base-side bent portion is smaller than the tab width of the tab base portion.

7. The power storage device according to claim 4, wherein the at least one bent portion of each of the electrode tabs comprises a plurality of bent portions, the electrode tabs constituting the electrode tab group each further include a tab base portion, the plurality of bent portions include a base-side bent portion located closest to the tab base portion, and at least one of the electrode tabs constituting the electrode tab group has a shape in which the tab width of the base-side bent portion is smaller than the tab width of the tab base portion.

8. The power storage device according to claim 1, wherein among the electrode tabs constituting the electrode tab group, at least an electrode tab with the base-side bent portion bent with a smallest curvature radius has a shape in which the tab width of the base-side bent portion is smaller than the tab width of the tab base portion.

9. The power storage device according to claim 5, wherein among the electrode tabs constituting the electrode tab group, at least an electrode tab with the base-side bent portion bent with a smallest curvature radius has a shape in which the tab width of the base-side bent portion is smaller than the tab width of the tab base portion.

10. The power storage device according to claim 6, wherein among the electrode tabs constituting the electrode tab group, at least an electrode tab with the base-side bent portion bent with a smallest curvature radius has a shape in which the tab width of the base-side bent portion is smaller than the tab width of the tab base portion.

11. The power storage device according to claim 7, wherein among the electrode tabs constituting the electrode tab group, at least an electrode tab with the base-side bent portion bent with a smallest curvature radius has a shape in which the tab width of the base-side bent portion is smaller than the tab width of the tab base portion.

12. The power storage device according to claim 1, wherein more than half of the electrode tabs constituting the electrode tab group each have a shape in which the tab width of the base-side bent portion is smaller than the tab width of the tab base portion.

13. The power storage device according to claim 5, wherein more than half of the electrode tabs constituting the electrode tab group each have a shape in which the tab width of the base-side bent portion is smaller than the tab width of the tab base portion.

14. The power storage device according to claim 6, wherein more than half of the electrode tabs constituting the electrode tab group each have a shape in which the tab width of the base-side bent portion is smaller than the tab width of the tab base portion.

15. The power storage device according to claim 7, wherein more than half of the electrode tabs constituting the electrode tab group each have a shape in which the tab width of the base-side bent portion is smaller than the tab width of the tab base portion.

16. The power storage device according to claim 8, wherein more than half of the electrode tabs constituting the electrode tab group each have a shape in which the tab width of the base-side bent portion is smaller than the tab width of the tab base portion.

17. The power storage device according to claim 9, wherein more than half of the electrode tabs constituting the electrode tab group each have a shape in which the tab width of the base-side bent portion is smaller than the tab width of the tab base portion.

18. The power storage device according to claim 1, wherein the electrode body is accommodated in the case without being bound by the case in an electrode body thickness direction.

19. A power storage device comprising:
an electrode body having a flat shape and including a plurality of electrode sheets each having an electrode sheet body, and an electrode tab protruding from the electrode sheet body, in which the electrode tabs of the electrode sheets overlap one another in a tab thickness direction to form an electrode tab group, wherein the tab thickness direction is perpendicular to both a tab width direction and a direction in which the electrode tab protrudes from the electrode sheet body;
a case in which the electrode body is accommodated; and
an electrode terminal that is fixedly provided to the case, extends from inside to outside of the case, and is bonded to the electrode tab group in the case,
wherein each of the electrode tabs includes a plurality of bent portions bent in the tab thickness direction,
the electrode tabs constituting the electrode tab group each include a tab connection portion including a bonded portion that is located on an inside in the tab width direction and bonded to the electrode terminal directly or through another or other electrode tabs, and the at least one bent portion includes a connection-side bent portion located close to the tab connection portion,
the electrode tabs constituting the electrode tab group each further include a tab base portion,
the plurality of bent portions include a base-side bent portion located closest to the tab base portion,
among the plurality of bent portions, the connection-side bent portion and the base-side bent portion are bent in opposite directions in the tab thickness direction, forming an S-shaped electrode tab,
at least one of the electrode tabs constituting the electrode tab group has a shape in which a tab width of the connection-side bent portion is smaller than a tab width of the tab connection portion, and
at least one of the electrode tabs constituting the electrode tab group has a shape in which a tab width of the base-side bent portion is smaller than a tab width of the tab base portion,
wherein among the electrode tabs constituting the electrode tab group, at least an electrode tab with the connection-side bent portion bent with a smallest curvature radius has a shape in which the tab width of the connection-side bent portion is smaller than the tab width of the tab connection portion,
wherein more than half of the electrode tabs constituting the electrode tab group each have a shape in which the tab width of the connection-side bent portion is smaller than the tab width of the tab connection portion,
wherein the at least one bent portion of each of the electrode tabs comprises a plurality of bent portions, and
at least one of the electrode tabs constituting the electrode tab group has a shape in which the tab width of the base-side bent portion is smaller than the tab width of the tab base portion,
wherein among the electrode tabs constituting the electrode tab group, at least an electrode tab with the base-side bent portion bent with a smallest curvature radius has a shape in which the tab width of the base-side bent portion is smaller than the tab width of the tab base portion,
wherein more than half of the electrode tabs constituting the electrode tab group each have a shape in which the tab width of the base-side bent portion is smaller than the tab width of the tab base portion, and
wherein the electrode body is accommodated in the case without being bound by the case in an electrode body thickness direction.

* * * * *